3,184,416
PRODUCTION OF ZIEGLER POLYMERIZATION CATALYSTS
Edward H. Mottus, Dayton, Ohio, assignor to Monsanto Company, a corporation of Delaware
No Drawing. Filed May 22, 1958, Ser. No. 736,976
2 Claims. (Cl. 252—429)

This invention relates to Ziegler catalysts, to the preparation of Ziegler catalysts, and to the use of Ziegler catalysts to effect chemical reactions, especially polymerizations. In certain preferred aspects, the invention pertains to the production of high-density polyethylene by polymerizing ethylene in the presence of a catalyst exemplified by the material obtained by the interaction of a trialkyl aluminum with titanium tetrachloride (hereinafter referred to as Ziegler catalysts), said catalyst having been especially treated to result in the production of polyethylene of improved properties over that obtainable with the same catalyst not so treated.

SUMMARY OF INVENTION

The essence of the present invention lies in the use of a critical concentration of water to modify the characteristics of Ziegler catalysts, whereby the use of such modified catalysts permits the production of improved Ziegler polymers. In a fundamental aspect, the invention involves the use of a water-modified Ziegler catalyst to narrow the molecular weight distribution pattern of Ziegler polymers, with consequent improvement in many properties. One polymerization of special interest is the production of polyethylene of improved melt index properties made possible by the practice of this invention.

SIGNIFICANCE OF POLYMER DENSITY

In any polymer showing the presence of a crystalline phase by X-ray diffraction, the density is a direct function of the crystallinity, the greater the crystallinity the higher the density. High-molecular-weight polymers of ethylene, called polyethylene, are important materials of commerce, and they are partially crystalline semi-rigid polymers having great utility. By the use of certain types of catalysts, advanced by Professor-Dr. Karl Ziegler, polyethylene can be made at low pressures and such polyethylene has considerably higher density—generally about 0.940 to 0.948 g. per cc., the density depending somewhat upon reaction conditions and especially on solvent, e.g., in kerosene the usual density is within the range of 0.942 to 0.947 and with heptane the usual density is about 0.948—than polymethylene as usually made by the earlier high-pressure oxygen- or peroxide-catalyzed polymerization methods. These higher density polyethylenes, as a result of their greater crystallinity are much more rigid than the high-pressure polyethylenes, and have considerably higher softening and melting points. These properties make possible the improvements in the heretofore known uses of polyethylenes, and indicate the likelihood that the high-density polyethylenes may replace certain other thermoplastic polymers in various uses. It thus becomes clear that still further increase in crystallinity of polyethylene, which is reflected in increased density, would result in still further improvements in certain properties such as stiffness and resistance to heat. Also, increased crystallinity in polyethylene is reflected in an increased tensile yield strength which, of course, is quite desirable.

SIGNIFICANCE OF MELT INDEX

Although Ziegler polymers have many valuable properties, Ziegler polymers, particularly Ziegler polyethylenes, have in the past been characterized by a low melt index. The melt index is a measure of the injection molding characteristics of the polymer and is an indication of the molecular weight range of the polymer. In the absence of the improvement of my invention, the Ziegler process frequently produces polymers of a molecular weight so high, and a melt index so low, as to preclude the use of the polymer in many important practical applications. The melt index properties indicate the ease with which the polymer can be processed by such procedures as injection molding.

The present commercial Ziegler polyethylene polymers are defective in the melt index properties, the melt index being too low for many practical applications. More particularly, polymeric product having a melt index of 0 is frequently encountered. Polyethylene having a melt index of 0 is unsuitable for injection molding because of its content of high molecular weight polymers. For most practical applications, particularly in injection molding applications, the melt index should be about 0.01 to 10, preferably 0.1 to 6.0. It has been discovered, according to this invention, that the molecular weight of polyethylene, as reflected by the melt index, can be controlled in the said polymerization processes by controlling the catalyst activity by the addition of a critical concentration of water to the polymerization catalyst.

Various methods have been tried in order to control the melt index of the polymer, e.g., specific elevated temperatures during polymerization, and specific ratios of catalyst components. The operating conditions are thus unduly restricted; furthermore, control of the solubility of the reactants is sacrificed when the temperature or ratio of components is narrowly specified. My invention provides a new method for controlling the melt index of the polymers produced.

The present invention makes it possible to prepare polyethylene and other polymers having a melt index within a desirable predetermined range. It is not possible to set any absolute limit on the desirable melt index, as the requirements in this regard will depend on the ultimate application of the polymers. The use of the water modified catalyst as provided by the present invention makes it possible to obtain polyethylene having a density comparable to or higher than ordinary Ziegler polyethylene, and with improved melt index properties. The modified catalyst produces polyethylenes comparable in properties to the "center" fraction obtained by fractionation of ordinary Ziegler polyethylene.

Various other polymers, especially those of unsaturated hydrocarbons such as propylene, butenes, styrene, and the like, can be prepared in crystalline form. It has been said that crystallinity of such polymers can result from an "isotactic" structure of the molecule, which word is used to indicate a regular arrangement of side groups along the carbon chain for at least considerable portions of the molecule. Many of the crystalline polymers of these unsaturated hydrocarbon monomers are obtained by fractionation of total polymer such as by use of one or more solvents which dissolve the amorphous or lesser crystalline portion of the polymer. In these polymers other than polyethylene, though crystallinity may primarily result from a regular arrangement of side groups on the chain, it also, no doubt, is somewhat dependent on the extent of branching of the chains, just as in polyethylene. Thus, increased linearity of polymer chain, whether it be polyethylene, polypropylene, polystyrene or the like, as reflected by a lessening of the branching of the chain, results in a higher degree of crystallinity with resulting improved properties as mentioned heretofore.

It can also be appreciated that the melt index properties of these other polymers, e.g., those of unsaturated hydrocarbons such as propylene, butenes, styrene, and the like, and copolymers of the foregoing with each other or with ethylene will benefit from use of the modified catalysts of the present invention.

While the present invention is of special interest at the present time with respect to polyethylene in which crystallinity is almost solely a reflection of the degree and type of branching, it is also applicable to all Ziegler-type polymerizations, special reference being made to the preparation of polypropylene, polybutene, poly-4-methylpentene-1, and polystyrene which are currently of the most potential interest from a commercial viewpoint.

ZIEGLER-TYPE CATALYSTS

There has recently come into commercial prominence the polymerization of ethylene and other monomers through the agency of a type of catalyst advanced by Prof.-Dr. Karl Ziegler of the Max Planck Institute at Mulheim (Ruhr), Germany. Probably, the preferred group of these catalysts is that disclosed in Belgian Patent No. 533,362, issued May 16, 1955, to Ziegler, the disclosure of which is hereby incorporated herein by reference, namely catalysts prepared by the interaction of a trialkylaluminum with a compound of a metal of Group IV–B, V–B, or VI–B of the Periodic System, including thorium and uranium, and especially compounds of titanium, zirconium, and chromium. These and the variety of other catalysts of the Ziegler type, can be considered exemplified by the catalysts obtained by the interaction of a trialkyl-aluminum with titanium tetrachloride. Other catalysts of the Ziegler type differ from those disclosed in the above-mentioned Belgian Patent No. 533,-362, in various ways, for example, as follows. Instead of or in addition to the aluminum trialkyls, catalysts of the type described in the Belgian patent can be made by reacting the various metal compounds of Groups IV–B, V–B, and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy and diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these, of course, being reacted with compounds of Groups IV–B, V–B, or VI–B metals. Another Ziegler-type catalyst is prepared by the interaction of an aluminum compound of the general formula $R_2AlX$, where R is a hydrocarbon radical such as alkyl or aryl, and X is a halogen, such as chlorine or bromine, with a compound of a metal of Group VIII of the Periodic System, e.g., iron, nickel, cobalt, or platinum, or manganese, for example, dimethylaluminum monobromide plus ferric chloride, diisobutylaluminum chloride plus nickel (trivalent) chloride, diethylaluminum monochloride plus manganic chloride. Yet another combination is that of the Group IV–B, V–B, or VI–B metal compounds with aluminum compounds of the general formula $R_2AlX$, where R is hydrogen or a hydrocarbon radical, and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler-type polymerization catalysts comprises compounds of the Group IV–B, V–B, and VI–B heavy metals as previously mentioned, combined with the alkali metal alkyls, for example, with lithium-, sodium-, or potassium methyl, -ethyl, -benzyl, -isobutyl, or with complex compounds of such alkali metal alkyls with organic compounds of aluminum, magnesium, or zinc as mentioned above, or complex compounds of alkali metal hydrides with such organic compounds of aluminum, magnesium, or zinc, for example, butyl lithium plus zirconium tetrachloride, sodium tetramethylaluminum plus titanium tetrachloride or plus thorim acetylacetonate. Other Ziegler-type catalysts are prepared by using (in conjunction with compounds of Group IV–B, V–B, and VI–B metals), instead of trialkylaluminums, triaryl-, triaralkyl-, trialkaryl- or mixed alkyl- and aryl-aluminum, zinc, magnesium or alkali metals, e.g., phenyl sodium plus $TiCl_4$.

Those skilled in the art having knowledge of these matters, refer to catalysts of the foregoing type as Ziegler or Ziegler-type catalysts; or as Ziegler catalysts adapted for low-pressure polymerization of ethylene or ethylenically unsaturated monomers; and to polymers prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers. Thus, ethylene and other monomers can be polymerized by catalysts obtained by treating compounds of heavy metals, especially compounds of the Group IV–B, V–B and VI–B metals, not with organometallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture and compounds containing active hydrogen atoms as determined by the Zerewitinoff method. Attention is further directed to the teaching of various of the foregoing catalysts in Ziegler's Belgian Patents 534,792 and 534,888, the disclosures of which are hereby incorporated herein by reference. Still another disclosure incorporated herein by reference is that of Belgian Patent 538,782, issued jointly to Montecatini Societa Generale per l'Industria Mineraria e Chimica Anonima and Prof. Dr. Karl Ziegler, disclosing the polymerization of olefins having at least 3 carbon atoms in the molecule, and their copolymerization with each other and with ethylene, using a variety of Ziegler catalysts; olefins, especially α-olefins, disclosed in said Belgian Patent 538,728 include propylene, butylene, isobutylene, pentylene, hexylene, vinyl cyclohexane, and styrene. Substantially the same disclosure is found in Australian patent application 9,651/55 also filed by Montecatini and Zielger jointly. Catalysts of the said Belgian Patent 538,728 and Australian application 9,651/55 are obtained by reaction of compounds of metals of the left-hand column of the 4th to 6th groups of the periodic table of elements, including thorium and uranium, with metals, alloys, metal hydrides, or metal-organic compounds of metals of the 1st to 3rd groups of the periodic table. Yet another disclosure incorporated herein by reference is that of Ziegler's Australian patent application 13,453/55, opened to public inspection May 10, 1956, directed to polymerizing ethylene with catalysts comprising mixtures of organic compounds of the metals of Groups I to III of the Periodic System of the general formula $R_nMeX$, wherein R represents a hydrocarbon radical; X, a hydrocarbon radical or halogen; and Me, a metal of Groups I to III of the Periodic System; and $n$, an integer which is less by one than the valency of the metal Me, with compounds of the metals of Group VIII of the Periodic System or manganese.

A portion of the Ziegler catalysts can be defined as catalysts comprising mixtures of metals or metal compounds of the 1st to 3rd groups of the periodic chart of the elements with compounds of metals of the 4th to 6th groups (including thorium and uranium) of the said periodic chart.

Another group of valuable Ziegler catalysts can be defined as mixtures of organic compounds of metals selected from the group consisting of $R_nMeX$ in which R is hydrocarbon; Me is a 1st to 3rd group metal; X is hydrogen, hydrocarbon or halogen; and $n$ is a number which is lower by 1 than the valence of the metal Me, with a salt of a Group IV–B to VI–B metal. The molar proportion of the organic metal compound is ordinarily sufficient to reduce the valence of the Group IV–B to VI–B metal at least in part.

Ziegler catalysts can also be defined as including all polyvalent metal compounds in combination with reducing agents, particularly organometals, which are effective to reduce the valence of the polyvalent metal; or as compositions containing polyvalent metals in a valence state lower than their maximum state and adapted for the low-pressure polymerization of ethylene so that when suspended in a concentration of about 20 mmoles/liter (based on polyvalent metal) in a well-agitated inert solvent, it will cause an ethylene uptake rate of at least 5 grams per hour per liter of solvent.

It will be seen from the foregoing that a large variety of co-reactants can be employed which by interaction with each other result in the formation of a Ziegler catalyst. It is generally considered that the Ziegler catalysts are obtained by interaction of a polyvalent metal compound with another metal in elemental or combined form resulting in reduction of the valence state of the first said metal. The resulting polymetal Ziegler catalyst is believed to act as a heterogeneous catalyst, i.e., at least some of the product obtained by the interaction of the materials in question is present in solid form, although often in such finely-divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The essence of the present invention, however, is not to be found in the particular Ziegler-type catalyst employed but rather in the use of a critical concentration of water in the preparation of such catalyst, with consequent advantages when used to catalyze a variety of chemical reactions, polymerization of ethylenically unsaturated monomers being of particular interest.

ZIEGLER REACTIONS AND POLYMERS

Ziegler catalysts can be employed to catalyze a variety of chemical reactions, for example the chlorination of benzene to product mono- and polychlorobenzenes, especially ortho- and para-dichlorobenzene. The reaction of most intense commercial interest at the present time is polymerization. The present invention is broadly applicable to all Ziegler catalysts, and their use in all chemical reactions catalyzed thereby, and insofar as polymerization is concerned, is broadly applicable to all Ziegler-type polymers, i.e., all polymer prepared by polymerizing a monomer or mixture of monomers in the presence of a Ziegler-type catalyst. A monomer which can be so polymerized can properly be called a Ziegler-polymerizable monomer. Of special interest, of course, are those Ziegler solid polymers of sufficiently high molecular weight to be useful in the plastics industry, but benefits of the invention are obtainable in preparing lower-molecular-weight Ziegler semi-solid and even liquid polymers which can be used, for example, in adhesives, as lube oil additives, etc. The preferred polymers have a molecular weight of at least 2,000 and preferably at least 10,000. Those Ziegler polymers to which the preparation of the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941), and the Journal of the American Chemical Society, 73, page 1901 (1951).

At the present time, ethylene is the preferred monomer for preparing Ziegler polymers. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Ser. No. 502,008, filed April 18, 1955, now abandoned. Also of interest are the copolymers of butadiene and/or isoprene with styrene, disclosed in the copending application of Carroll A. Hochwalt, Ser. No. 501, 795, filed April 18, 1955. Homopolymers of butadiene, homopolymers of isoprene and copolymers of butadiene with isoprene, as prepared by the use of Ziegler-type catalysts are also of great interest, having exceptionally low temperature properties, as disclosed in the copending application of Robert J. Slocombe, Ser. No. 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexane, styrene, vinylnaphthalene, vinyl aromatic hydrocarbons generally, etc. Styrene when polymerized in the presence of Ziegler-type catalysts gives a high-molecular-weight polymer showing a crystalline structure by X-ray diffraction examination. Ziegler-type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Ser. No. 507,717, filed May 11, 1955, now abandoned. A variety of copolymers of the various monomers named above with each other and with other comonomers can be prepared by Ziegler catalysis, and the present invention in its broadest scope includes all such and, in fact, all polymers prepared through the agency of Ziegler-type catalysts on any single monomer or mixture of monomers polymerizable with such catalysts.

Despite the broad scope of the invention, it will be found more convenient in most of the present application to discuss the invention with specific reference to preferred embodiments thereof, and accordingly, Ziegler-type polyethylene will be especially referred to by way of example. Likewise, referred to especially by way of example will be catalysts prepared by the interaction of a trialkylaluminum with titanium tetrachloride, this being the preferred example of the preferred group of Ziegler catalysts which are those prepared by interaction of (a) an aluminum compound of the general formula $R_2AlX$, wherein R is an alkyl, cycloalkyl, or aryl radical and X is hydrogen, halogen, or an alkyl, cycloalkyl, or aryl radical, with (b) a metal halide selected from the group consisting of the chlorides, bromides and iodides of titanium and zirconium.

THE INVENTION IN FURTHER DETAIL

In accordance with one embodiment of the present invention, an active Ziegler catalyst is prepared, usually, but not always, as a dispersion in an inert organic liquid, and there is added to such catalysts a portion of an inert diluent containing water effective to beneficiate, i.e. to beneficially modify the catalyst, but insufficient to destroy its activity. A suitable amount of diluent containing water will vary somewhat, dependent upon the catalyst and the reaction conditions and these amounts will be discussed in detail hereinafter, but in general the amount of water to be added is in the neighborhood of 0.01 to 0.75, preferably 0.1 to 0.50 gram-mole of water per gram-atom of the multivalent metal in the metal compound that is reduced in preparing the catalyst, e.g., TiCl$_4$. Too little of the water modifier is not very effective, but on the other hand, not very much can be used or the catalyst will be deactivated, i.e., its catalytic activity will be destroyed. It appears that even slight amounts of water decrease the catalytic activity somewhat, but in some instances this is not undesirable; and in other instances, in accordance with certain aspects of the invention, I readily overcome this effect partially or completely by alteration in reaction conditions, especially by imposing moderate pressure. It also appears that, in general, an amount of water added causes a change in molecular weight of polymer obtained by use of the thus-treated Ziegler catalysts.

The amount of water to be employed is best related to the amount of catalyst and will vary considerably depending upon the particular catalyst, its method of preparation, and the extent to which catalyst modification is desired. However, the amount of water to be used is always small, and an amount will be chosen effective to modify the catalyst but insufficient to decrease its activity to an undesirable extent and certainly insufficient to destroy the catalyst activity completely. A Ziegler catalyst can be considered deactivated for most purposes if it is incapable when suspended in a well-agitated inert solvent in concentration of about 20 mmoles/liter (based on the multivalent metal) of causing an ethylene uptake rate of at least 1 gram per liter of solvent per hour at 20 atmospheres' pressure; it is not usually practical to use a catalyst which does not have an uptake rate of at least 5–10 grams/liter/hour under such circumstances, and it is preferable that the uptake rate be 100 grams/liter/hour or higher. When the catalyst is employed under pressure and possibly at other concentrations, it should have an uptake rate of at least 25 grams/liter/hour under the conditions of employment, and preferably an uptake rate of 100 grams/liter/hour or higher. The ethylene uptake rates for any conditions can readily be ascertained. Even though a catalyst may be inactive according to the foregoing criteria, it should be realized that it can still have activity in some reactions, and therefore the present invention in its broader aspects contemplates any water-modified Ziegler catalyst. The Ziegler catalysts are made up of compounds of polyvalent metals which are reduced by reducing agents, the former being exemplified by TiCl$_4$ and the latter being exemplified by trialkylaluminums. For each mole of the said heavy metal compound which is reduced, when the said compound contains one atom of metal per molecule, the amount of water to be used will generally be within the range of 0.01 to 0.75 mole. The optimum range, and even the operable range, in a given situation may be considerably smaller than this stated broad range. In some instances, the range of optimum or operable proportions will be outside these stated ranges. However, it is a matter of the simplest of tests to determine operable and optimum quantities of the water modifier with any given Ziegler catalyst. Such test can, for example, be carried out as described in the specific examples hereinafter, and having had the benefit of the present disclosure, they are well within the skill of the art. With Ziegler catalysts prepared by the interaction of a trialkylaluminum with titanium tetrachloride, there is often used an amount of water within the range of from 0.01 to 0.75 mole per mole of TiCl$_4$ used, i.e., per gram-atom of titanium. It is often desirable to utilize the water on approximately a mole ratio of from about 0.01 to about 1.50 moles for each gram-atom of aluminum.

When Ziegler catalyst prepared in accordance with the present invention is used as a polymerization catalyst, the molecular weight of the resulting polymer is often lower than the molecular weight would be if a modifier had not been used in preparing the catalyst and the polymerization carried out under otherwise identical conditions. In many instances, this is very desirable, as when monomer, catalyst and reaction conditions are chosen to give polymers having desirable properties but whose molecular weights are somewhat higher than desired for a given purpose. However, if it is desired to overcome this particular effect of the chosen modifier in lowering the molecular weight, this can be done by decreasing the aging time of the catalyst prior to addition of the modifier, or by increasing the aging time subsequent to the modifier addition. The mole ratio of a trialkylaluminum to a titanium salt used in preparing the catalyst also can be used to effect control of molecular weight, the higher ratios producing higher molecular weights. The R$_3$Al/TiCl$_4$ mole ratios employed are generally in the range of about 0.3:1 to 0.8:1, although a higher or lower ratio can be used, for example, 0.1:1 to 3:1 or so.

Use of an added amount of water tends to decrease the activity of the catalyst. As already pointed out, the amount of water added must be limited so that this decrease in activity does not occur to an extent that is undesirable, all other things being considered, and certainly must be limited so that the catalyst activity is not destroyed. In either case, the activity of the catalyst can be noted by the rate at which ethylene is polymerized or other reaction is effected by the aid of the catalyst in a comparison of said rate with the rate where the modifier is not used and/or the said mole ratio is not increased. Decreased catalyst activity, which results in a decreased rate of reaction, can be compensated for by a change in several reaction variables such as by increasing the amount of catalyst, increasing the temperature, or increasing the pressure. I usually prefer to increase the pressure. I find that a very modest increase in pressure, say, from atmospheric up to 50 or 100 or 200 pounds per square-inch gauge, is usually quite sufficient to obtain adequate reaction rate. In the case of catalysts which require pressure in the first instance for a satisfactory rate of polymerization when being used to polymerize ethylene or other monomer, the pressure can be still further increased to restore the reaction rate which has decreased because of the use of water modification and/or an increase in the mole ratio of reducing agent to polyvalent metal compound can be employed in preparing the catalyst.

I prepare an active Ziegler catalyst, preferably as a dispersion in an inert organic liquid, such as an aliphatic or aromatic hydrocarbon as will be discussed more in detail hereinafter. This dispersion is ordinarily a colloidal suspension of catalyst particles in the liquid. I then add water in the chosen amount. Preferably the said catalyst is diluted with the inert organic liquid containing a critical concentration of water with vigorous agitation so as to prevent localized concentration or reaction of the water with the catalyst during the treatment of the catalyst therewith. Ordinarily, the monomer is polymerized in the presence of the modified catalyst dispersion. However, prior to the polymerization or other use of the catalyst, part or all of the solvent may be removed by filtration, evaporation, or the like, care being taken not to use conditions for such a separation that will deactivate the catalyst.

Ordinarily, it is quite sufficient and, in fact, desirable to use only water as the modifier compound. However, it is not beyond the scope of the invention to utilize an admixture of water with a reactive organic oxygen compound described in copending application Ser. No. 695,153 or an admixture of water with one or more such organic oxygen compounds with any other catalyst modifying agent that may be desired, e.g., with the thiophenols described in copending application Ser. No. 609,798, filed September 14, 1956, now U.S. Patent 3,009,908, issued November 21, 1961.

DETAILS OF PREPARATION AND USE OF ZIEGLER CATALYSTS

More detailed information will now be given on preferred procedures and components for preparing various Ziegler catalysts, and it will be understood that the procedures given herein with respect to use of a water modifier will be followed. Ziegler catalysts for whatever use desired, can be prepared in the vessel in which the catalyzed reaction is to be carried out, or can be prepared in one vessel and then transferred to the intended reaction vessel, and in either event, can either be used immediately after preparation or after a period of time elapses between the preparation of the catalyst and its subsequent use to catalyze, e.g., polymerization. If the catalyst is to be used after such a period of time, it is apt to lose activity during storage period and/or produce polymer of an increased molecular weight as compared with that produced with fresh catalyst and these disadvantages can be minimized by storing Ziegler catalyst at temperatures below about 10° C. and preferably below —25° C. for fairly long storage periods, as disclosed and claimed in the copending application of Robert J. McManimie, Harry G. Hurst, and Edward H. Mottus, Serial No. 586,352, filed May 22, 1956, now abandoned. While Ziegler catalysts are often conveniently prepared at room temperature, they can be prepared at higher temperatures, and also certain advantages are obtained, including uniform catalyst activity over the course of a reaction period and more effective removal of catalyst residue if the catalyst is prepared at temperatures below about —25° C. as disclosed and claimed in the copending application of Robert J. McManimie, Harry G. Hurst, and Edward H. Mottus, Ser. No. 586,352, filed May 22, 1956.

I prefer catalysts prepared by the interaction of (a) an aluminum compound of the general formula $R_2AlX$, wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminum, e.g., triethylaluminum, triisobutylaluminum, trioctylaluminum, with titanium tetrachloride.

Suitable aluminum compounds to be reacted with the chlorides, bromides and iodides of titanium or zirconium are those represented by the general formula $R_2AlX$, wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di-(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides, or iodides of titanium or of zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides, however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium) can vary over a wide range, suitable values being from 0.1:1 to 10:1 on up to 15:1 or higher. It is generally preferred to use an Al:Ti mole ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa, preferably in the presence of an inert organic solvent. Such solvents can suitably be saturated aliphatic and alicyclic, and aromatic hydrocarbons, halogenated hydrocarbons, and saturated ethers. The hydrocarbon solvents are generally preferred. By way of example can be mentioned liquefied ethane, propane, isobutane, normal butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances, it is also advantageous to prepare the catalyst in the presence of a monomer; for example, if the catalyst is prepared in the presence of liquid ethylene, and then used to polymerize ethylene, a high yield of polyethylene results.

It may also be mentioned here that the polymerization can readily be effected in the presenec of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents, or inert organic liquids.

The amount of catalyst required is dependent on the other variables of the particular reaction, such as polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.001:1 and much lower values such as 0.0001:1 can sometimes be used.

The polymerization can be effected over a wide range of temperatures, again the particular preferred temperatures being chosen in accordance with the monomer, pressure, particular catalyst and other reaction variables. For many monomers from room temperatures down to say −40° C. and even lower are suitable, and in many cases it is preferred that the temperature be maintained at below about 35° C. However, for other monomers, particularly ethylene, higher temperatures appear to be optimum, say from 50° to 90° C. for ethylene. Temperatures ranging up to 150° C. and higher are generally satisfactory for Ziegler-type polymerization.

The pressure at which the polymerization is carried out is dependent upon the chosen monomer or monomers, as well as other variables. In most instances, the polymerization is suitably carried out at atmospheric pressure or higher. Sub-atmospheric pressures are permissible. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and, in some instances, on polymer quality. The choice of whether or not to use an appreciably elevated pressure will be one of economic and practical considerations taking into account the advantages that can be obtained thereby.

On a large or commercial scale difficulty is encountered in dissipating the quantity of heat with polymerization. This problem has been met in the past by diluting the olefin monomer with an inert gas and by operation at low pressures. By using my invention of modifying the catalyst activity with a critical concentration of water the inert gaseous diluent for the monomer can be omitted if desired; and even though the reactivity of the catalyst has been reduced an improved yield of polymer per unit time can be realized by increasing the pressure of the monomer. Polymer prepared at comparatively high pressures, e.g., 100 to 200 atmospheres, has the desirable property of higher density than usually achieved.

In the practice of my invention the critical concentration of water required to modify the catalyst activity can be charged to the system by various procedures. For example, the water can be added to the titanium compound before mixing with the Group I to III metal organic compound. The water can be fed into the polymerization reactor mixed with the monomer, or preferably the diluent is mixed with water and the "wet" solvent then added to a concentrate of premixed catalyst constituents.

The catalyst is sensitive to various poisons, among which may be mentioned oxygen, carbon dioxide, carbon monoxide, acetylenic compounds such as acetylene, vinylacetylene, and the like. For this reason, suitable precautions should be taken to protect the catalyst and the reaction mixture from excessive contact with such materials. An excess of the aluminum compound tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material. It is desirable to protect the catalyst during preparation, storage, and use by blanketing with an inert gas, e.g., nitrogen, argon, or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances, the polymerization mixture can be allowed to remain quiescent while the polymerization takes place. In the case of the more rapid reactions with the more active catalysts, means can be provided for refluxing monomer and solvent if any of the latter is present, and thus remove the heat of reaction. In any event, adequate means should be provided for dissipating the exothermic heat of polymerizaiton. If desired, the monomer can be brought in vapor phase into contact with the solid catalyst, in the presence of or absence of liquid solvent. The polymerization can be effected in the batch manner, or in a continuous manner, such as, for example, by passing the reaction mixture through an elongated reaction tube which is contacted externally with suitable cooling medium to maintain desired reaction temperature; or by passing the reaction mixture through an equilibrium-overflow reactor, or a series of the same.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

In order to illustrate some of the various aspects and advantages of the invention, illustrative examples are given herein. Ethylene has been chosen as a representative monomer, triisobutylaluminum has been chosen as a representative reducing agent in preparing the catalyst, titanium tetrachloride has been chosen as a representative polyvalent metal compound that is reduced in preparing the catalyst, kerosene has been chosen as a representative inert organic liquid for preparation of the catalyst dispersion and in which to carry out the polymerization. It will, of course, be understood that variations from the particular catalyst components, reactants, solvents, proportions, temperatures and the like can be made without departing from the invention.

*Example 1*

A representative Ziegler-type catalyst was prepared in quantity in advance for use in a series of examples. Into 500 ml. of thoroughly dried kerosene was charged 20.901 g. (0.1054 mole) aluminum triisobutyl. Into a separate 500 ml. portion of anhydrous kerosene was weighed 40.222 g. (0.212 mole) TiCl$_4$. The solution of Al(i-butyl)$_3$ in kerosene was then slowly added to the TiCl$_4$ solution with vigorous stirring, and then 222 ml. of kerosene added. Thus, there was obtained a 5% (weight/volume) solution of a representative Ziegler catalyst in kerosene having a mole ratio, AlR$_3$/TiCl$_4$, of 0.498.

Example 2

Into a tubular reactor was charged 20 ml. of the catalyst slurry prepared in Example 1. To this pre-made catalyst slurry was then added 230 ml. of "wet" kerosene containing 82 p.p.m. water.

A standard "wet" kerosene was prepared by adding 1 ml. of water to 800 ml. of kerosene. The mixture was heated to 80° C. slowly and then allowed to cool. Some of the water precipitated and the supernatant kerosene layer was decanted. By analysis this "wet" kerosene was found to contain 82 p.p.m. water.

The total amount of water added to the reactor was calculated to be 75.5 p.p.m., based on the total catalyst slurry charge.

The catalyst slurry was then heated to 65° and a mixture of ethylene and anhydrous nitrogen was added at a sufficient rate to maintain a saturated solution of ethylene at constant agitation (1100 revolutions per minute, turbine). Ethylene was absorbed at a rapid rate from the start of the gas flow. The temperature was controlled between 65° and 70° C., by intermittent cooling. Ethylene absorption was calculated to be 351 g. per liter of catalyst slurry per hour (g./l./hr.).

Ethylene flow was stopped when the polymer-catalyst slurry became too thick to stir with efficient agitation. The reactor was flushed with nitrogen, and the catalyst "quenched" by addition of anhydrous isobutanol. The reaction mixture was then filtered to separate the suspended polyethylene from the liquid. The polyethylene was then worked up by heating with additional alcohol, filtered, washed with fresh amounts of the same alcohol and hexane and finally dried.

Example 3

This example serves as a control for Example 2, and illustrates ethylene polymerization under anhydrous conditions.

Catalyst from Example 1, 20 ml., was charged into the glass tubular reactor and diluted with 230 ml. of anhydrous kerosene. In this example the operating conditions, as set forth in Example 2, were followed. Without the added influence of the critical concentration of water, ethylene was absorbed at the rate of 291 g./l./hr. Product polyethylene was isolated according to the general procedure of Example 2.

Example 4

To 200 ml. of anhydrous kerosene, dried by distilling from sodium, was added 6.737 g. Al(i-butyl)$_3$, 0.034 mole, and this solution was slowly added with vigorous mixing to a solution of 12.729 g. titanium tetrachloride, 0.067 mole, in 200 ml. anhydrous kerosene. An addition of 86 ml. anhydrous kerosene was then made to obtain a slurry of 4% (wt./vol.) concentration and having a mole ratio of Al triisobutyl/TiCl$_4$ of 0.506. This concentrated catalyst slurry was stored at 10° C. for one day before using as a polymerization catalyst.

Example 5

Catalyst slurry from Example 4, 25 ml., was diluted with 225 ml. of "wet" kerosene containing 42 p.p.m. H$_2$O to obtain 250 ml. of 0.4% catalyst concentration (wt./vol.) containing 38 p.p.m. water. At an ethylene polymerization temperature of 65° to 70° C., the ethylene was absorbed at a rate of 312 g./l./hr. Product polyethylene, isolated according to the general procedure of Example 2, was found to have a specific viscosity of 0.252, measured as a 0.1% solution in xylene at 100° C.

Example 6

The procedure and charge were identical to Example 5 except that the concentration of water in kerosene used to dilute the catalyst concentrate was initially adjusted so that the concentration of water in the ultimate slurry of 250 ml. of 0.4% (wt./vol.) catalyst was 20 p.p.m. The rate of ethylene absorbed at a polymerization temperature of 65° to 70° was calculated to be 308 g./l./hr. The product polymer, isolated as previously described, had a specific viscosity of 0.226, measured as a 0.1% solution in xylene at 100° C.

Example 7

Ethylene was polymerized at 65° to 70° C. using 25 ml. of the catalyst concentrate prepared in Example 4 diluted with 225 ml. of "wet" kerosene having an initial water content adjusted to give 250 ml. of catalyst slurry containing 10 p.p.m. water. At this level of water concentration the rate of ethylene absorbed was calculated as 352 g./l./hr. The product polyethylene was isolated and purified by the procedure of Example 2, and its physical properties determined. The polymer has a specific viscosity of 0.313 (0.1% solution in xylene at 100° C.).

Example 8

Catalyst concentrate from Example 4, 25 ml., was diluted with 225 ml. of "wet" kerosene to give 250 ml. of catalyst slurry containing 0.4% (wt./vol.) catalyst. The water content of the "wet" kerosene had been adjusted to give a final concentration of 5 p.p.m. water in the catalyst slurry. At this low level of water concentration, ethylene was absorbed at the rate of 296 g./l./hr. Product polymer, isolated by alcohol extraction of the catalyst as previously described, had a specific viscosity of 0.269 (0.1% solution in xylene at 100° C.).

Example 9

The glass tubular reactor was charged with 10 ml. of the catalyst slurry from Example 1 and then diluted with 240 ml. of "wet" kerosene containing 82 p.p.m. water to give a catalyst concentration of 0.2% (wt./vol.) having 78 p.p.m. water content. At this level of catalyst concentration and water content, it was observed that the catalyst was inactive, ethylene absorption rate was zero.

Example 10

The glass tubular reactor was charged with 10 ml. of the catalyst slurry prepared in Example 1. This slurry was diluted with 240 ml. of kerosene containing 34 p.p.m. of water, prepared by mixing 100 ml. kerosene containing 82 p.p.m. water, with 140 ml. anhydrous kerosene. There was obtained 250 ml. of 0.2% catalyst (wt./vol.) containing 33 p.p.m. H$_2$O.

In this run, using the identical procedure of the preceding examples, ethylene was absorbed at the rate of 49 g./l./hr. at 65° to 70° C. Product polyethylene was isolated according to the general procedure of Example 2.

Example 11

This run was made to check the activity of the catalyst prepared in Example 1 at 0.2% (wt./vol.) concentration under anhydrous conditions. The rate of ethylene absorption was 224 g./l./hr., at 65° to 70° C. The product polymer was isolated by alcohol extraction as previously described and its physical properties determined for comparison with the product obtained in Example 10.

The catalyst components used in the preceding examples are summarized in Table I. Very low concentrations of water, had no adverse effect on product properties. Totally unexpected improvement was realized when the concentration of water had a modifying effect on catalyst activity.

Table II points out the improvement in product melt index when using my invention in comparison with polyethylene prepared under anhydrous conditions as taught in the art.

TABLE I.—CATALYST CONCENTRATION

| Example No. | Millimoles Ti | Millimoles Al | Millimoles water | Water, p.p.m. |
|---|---|---|---|---|
| 2 | 3.46 | 1.73 | 1.04 | 75.5 |
| 3 | 3.46 | 1.73 | 0 | 0 |
| 5 | 3.46 | 1.73 | 0.53 | 38 |
| 6 | 3.46 | 1.73 | 0.28 | 20 |
| 7 | 3.46 | 1.73 | 0.14 | 10 |
| 8 | 3.46 | 1.73 | 0.07 | 5 |
| 9 | 1.72 | 0.86 | 1.08 | 78 |
| 10 | 1.72 | 0.86 | 0.47 | 34 |
| 11 | 1.72 | 0.86 | 0 | 0 |

TABLE II

| Product from Example No. | Melt index [1] | Memory,[2] percent | Spec. viscosity [3] |
|---|---|---|---|
| 2 | 0.23 | 56 | 0.184 |
| 3 (control) | 0.036 | 40 | 0.252 |
| 10 | 0.78 | 33 | |
| 11 (control) | 0.038 | 44 | 0.230 |

[1] ASTM D 1238–52T test method.
[2] Memory is defined as the percentage increase of the size of strand over the orifice size.
[3] Measured with a 0.1% solution in xylene at 100° C.

While the above examples teach representative conditions, which are effective when employing water modification of Ziegler catalysts, it will be realized that the conditions should be varied to some extent in accordance with the general principal taught herein in order to obtain optimum results with particular catalyst systems. In particular, the ratio of metal alkyl to polyvalent metal, the concentration of the catalyst, the concentration of the water modifier, the aging of the catalyst, the temperature and pressure of the polymerization etc., can be varied in order to vary the results in the manner taught hereinabove.

It has been discovered that the molecular weight distribution has a marked effect on properties of Ziegler polymers. If a normal Ziegler polyethylene is fractionated into various fractions according to molecular weight, i.e., low, medium, high, etc., it is found that some of the intermediate fractions having narrow molecular weight distributions possess desirable melt index values. Such polymers have a number average molecular weight, $M_n$, which approaches their weight average molecular weight, $M_w$, i.e., there are not a sufficient number of extremely high molecular weight species present to make the weight average molecular weight, $M_w$ (which gives weighted value to higher molecular weights), much higher than the number average molecular weights, $M_n$ (which is not unduly influenced by higher molecular weights). It follows from the above that it is desirable to have a low $M_w/M_n$ ratio, approaching 1. Extensive fractionation of the polymers according to molecular weight would not ordinarily be economically feasible. However, the present invention makes such factionation unnecessary as the polymers herein have a narrow molecular weight range. This provides an alternate method of defining the polymer produced by the processes of the present invention; the presence of the water modifier, as utilized in the present invention, makes it possible to obtain $M_w/M_n$ values less than 5, and often in the range of 3 to 2 or less.

The $M_w$ and $M_n$ utilized herein can be determined by calculation from distribution curves based upon viscosity measurements for the various polymer fractions; the method has been described in "Fractionation of Polyethylenes," by P. S. Francis, R. C. Cooke, Jr., and J. H. Elliott (presented at the American Chemical Society spring meeting in Atlantic City, 1956).

It is not seen to be necessary to define the particular mechanism by which the critical concentration of water affects the catalyst and produces valuable results, and we do not wish to be bound by any theory concerning the same. However, the following theory is of interest as improving understanding of the invention. It appears that the molecules of water act to diminish the reduction of $Ti^{+4}$ to $Ti^{+3}$ that normally occurs after polymerization is started; this apparently reduces the number of polymerization initiation sites available for polymerization resulting in a higher $M_n$. A second action is apparently selective as to type of site since the amount of extremely high molecular weight species (associated with highly reduced Ti catalysts) is diminished as is evidenced by a reduction in $M_w$ values and the lack of gel. Thus in certain broader aspects, the present invention concerns use of a modifier or poison for the purpose of minimizing the reduction of $Ti^{+4}$ to $Ti^{+3}$, $Ti^{+2}$, etc., with a view toward selectively reducing the number of initiation sites. For example, a few minutes after $Al(isobutyl)_3/TiCl_4$ catalyst has been prepared, the reduced titanium content, i.e., $TiCl_3$ may be about 30%, and this value may slowly rise during an ethylene polymerization to over 50% in two hours (in the absence of ethylene, it may rise to about 60% in the same period); however, when a suitable amount of water is added as modifier, the percent of reduced titanium tends to be stabilized against increase.

As is implicit in the above discussion, it is believed that the present invention provides an effective means of controlling the concentration and type of catalyst, thereby providing a means of controlling the course of the catalyzed polymerizations.

The improved molecular weight distribution of the polymers prepared by the process of the present invention causes improved transparency of the polymers. This makes it feasible to blow the polymers into films which are suitable as transparent wrapping materials and the like.

While the invention has been described with particular reference to preferred embodiments thereof, it will be appreciated that variations from the details given herein can be effected without departing from the invention in its broadest aspects.

What is claimed is:

1. A method of preparing a modified polymerization catalyst which comprises moxing trialkylaluminum with titanium tetrachloride in an inert organic liquid and adding water, the proportions being from 0.3 to 0.8 mole trialkylaluminum and 0.01 to 0.75 mole of water per mole of titanium tetrachloride.

2. A method of preparing a modified polymerization catalyst which comprises mixing trialkylaluminum with titanium tetrachloride in an inert organic liquid and adding water, the proportions being from 0.4 to 0.6 mole trialkylaluminum and 0.10 to 0.50 mole of water per mole of titanium tetrachloride.

References Cited by the Examiner

UNITED STATES PATENTS

| | | | |
|---|---|---|---|
| 2,721,189 | 10/55 | Anderson et al. | 252—429 |
| 2,846,426 | 8/58 | Larson et al. | 252—429 |
| 2,879,263 | 3/59 | Anderson et al. | 260—94.9 |
| 2,886,560 | 5/59 | Weber | 260—94.9 |
| 2,905,645 | 9/59 | Anderson et al. | 252—429 |
| 2,925,392 | 2/60 | Seelbach et al. | 252—429 |
| 2,984,658 | 5/61 | Seydel et al. | 260—94.9 |

FOREIGN PATENTS 218,210   11/58   Australia.

MAURICE A. BRINDISI, *Primary Examiner.*

JULIUS GREENWALD, *Examiner.*